(12) United States Patent
Srinivasan et al.

(10) Patent No.: US 12,019,908 B2
(45) Date of Patent: Jun. 25, 2024

(54) DYNAMICALLY ALLOCATED BUFFER POOLING

(71) Applicant: XILINX, INC., San Jose, CA (US)

(72) Inventors: Krishnan Srinivasan, San Jose, CA (US); Shishir Kumar, Hyderabad (IN); Sagheer Ahmad, Cupertino, CA (US); Abbas Morshed, Los Altos, CA (US); Aman Gupta, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 284 days.

(21) Appl. No.: 17/389,272

(22) Filed: Jul. 29, 2021

(65) Prior Publication Data
US 2023/0036531 A1    Feb. 2, 2023

(51) Int. Cl.
G06F 3/06 (2006.01)
(52) U.S. Cl.
CPC .......... *G06F 3/0656* (2013.01); *G06F 3/0604* (2013.01); *G06F 3/0631* (2013.01); *G06F 3/0644* (2013.01); *G06F 3/0653* (2013.01); *G06F 3/0679* (2013.01)
(58) Field of Classification Search
CPC .... G06F 3/0656; G06F 3/0604; G06F 3/0631; G06F 3/0644; G06F 3/0653; G06F 3/0679; G06F 5/06
See application file for complete search history.

(56) References Cited

U.S. PATENT DOCUMENTS

| | | | | |
|---|---|---|---|---|
| 5,432,908 A * | 7/1995 | Heddes | ...................... | G06F 5/06 711/158 |
| 6,078,919 A * | 6/2000 | Ginzburg | ................ | H04L 47/10 709/224 |
| 6,366,959 B1 * | 4/2002 | Sidhu | ...................... | H04L 65/80 709/214 |
| 7,342,934 B1 * | 3/2008 | Mott | ...................... | H04L 49/901 709/250 |
| 8,107,486 B1 * | 1/2012 | Walsh | ................... | H04L 49/103 710/52 |

(Continued)

OTHER PUBLICATIONS

Yeh, D. Yun, and Toshinori Munakata. "Dynamic initial allocation and local reallocation procedures for multiple stacks." Communications of the ACM 29.2 (1986): 134-141. (Year: 1986).*

(Continued)

*Primary Examiner* — Ramon A. Mercado
(74) *Attorney, Agent, or Firm* — Patterson + Sheridan, LLP

(57) ABSTRACT

Some examples described herein provide a buffer memory pool circuitry that comprises a plurality of buffer memory circuits that store an entry identifier, a payload portion, and a next-entry pointer. The buffer memory pool circuitry further comprises a processor configured to identify an allocation request for a first virtual channel associated with a sequence of buffer memory circuits and comprising a start pointer identifying an initial buffer memory circuit. The processor is further configured to program the first virtual channel circuit based on setting the start pointer for the first virtual channel circuit to be equal to the entry identifier of the initial buffer memory circuit. The processor is also configured to monitor usage. A length of the sequence of buffer memory circuits of the first virtual channel circuit is defined by a start pointer for a second virtual channel circuit subsequent to the first virtual channel circuit.

20 Claims, 10 Drawing Sheets

(56) References Cited

U.S. PATENT DOCUMENTS

| | | | | |
|---|---|---|---|---|
| 10,999,223 | B1* | 5/2021 | Jain | H04L 49/9015 |
| 2001/0043564 | A1* | 11/2001 | Bloch | H04L 41/0213 |
| | | | | 370/412 |
| 2002/0141427 | A1* | 10/2002 | McAlpine | H04L 47/39 |
| | | | | 370/413 |
| 2003/0123468 | A1* | 7/2003 | Nong | H04L 49/106 |
| | | | | 370/413 |
| 2004/0081096 | A1* | 4/2004 | Martin | H04L 47/39 |
| | | | | 370/231 |
| 2005/0076029 | A1* | 4/2005 | Ben-Zvi | G06F 16/24549 |
| 2006/0285548 | A1* | 12/2006 | Hill | H04Q 3/68 |
| | | | | 370/418 |
| 2016/0006579 | A1* | 1/2016 | Lamb | H04L 12/4625 |
| | | | | 370/254 |
| 2019/0042410 | A1* | 2/2019 | Gould | G06T 1/60 |
| 2023/0036531 | A1* | 2/2023 | Srinivasan | G06F 5/06 |

OTHER PUBLICATIONS

Zhang, H., et al., "A Multi-VC Dynamically Shared Buffer with Prefetch for Network on Chip," 2012 IEEE Seventh International Conference on Networking, Architecture, and Storage, 2012, pp. 320-327.

Nicopoulos et al., "ViChar: A Dynamic Virtual Channel Regulator for Network-on-Chip Routers", IEEE Micro, 2006.

\* cited by examiner

DYNAMICALLY ALLOCATED BUFFER POOLING

TECHNICAL FIELD

Examples of the present disclosure generally relate to providing buffers for networking switches and components, such as for network-on-chip (NoC) switches.

BACKGROUND

As technology evolves, integrated circuits (ICs) are including increasingly large numbers of hardware components. One type of such IC is a NoC, which is widely deployed to connect various hardware components, such as processors, storage devices, and the like, and enable data transfer between connected components. These connected components may be on-chip or external to the NoC. The NoC may manage the flow of data between the connected components. NoCs often use buffers for storage of data between the connected components. Such buffers may include a first-in-first-out (FIFO) buffer. However, the NoC buffers (FIFO or otherwise) are often unconfigurable once implemented and can often be inefficiently employed with respect to traffic conditions and the like.

Additionally, manufacturing NoCs (and similar chips) involves high-end or expensive processes, and the manufactured NoCs are expected to achieve certain performance levels or standards. Where the buffers of the manufactured NoC fail to meet the performance levels, the NoC may be unusable because they may be unconfigurable after implementation.

Thus, improvements in NoCs and similar ICs with respect to reconfigurability and usability are desirable.

SUMMARY

One embodiment describes a buffer memory pool circuitry. The buffer memory pool circuitry comprises a plurality of buffer memory circuits each configured to store an entry identifier, a payload portion, and a next-entry pointer. The buffer memory pool circuitry further comprises a processor circuitry configured to identify an allocation request for a first virtual channel circuit associated with a corresponding sequence of buffer memory circuits of the plurality of buffer memory circuits and comprising a start pointer identifying an initial buffer memory circuit of the corresponding sequence of buffer memory circuits. The processor circuitry is further configured to program the first virtual channel circuit based on setting the start pointer for the first virtual channel circuit to be equal to the entry identifier of the initial buffer memory circuit. The processor circuitry is also configured to monitor usage of the first virtual channel circuit to determine a reprogramming of the first virtual channel circuit. A length of the corresponding sequence of buffer memory circuits of the first virtual channel circuit is defined by a start pointer for a second virtual channel circuit subsequent to the first virtual channel circuit.

Another embodiment described herein is a method of allocating buffers, the method comprising identifying an allocation request for a first virtual channel circuit associated with a corresponding sequence of buffer memory circuits of a plurality of buffer memory circuits, each buffer memory circuit configured to store an entry identifier, a payload portion, and a next-entry pointer, the first virtual channel circuit comprising a start pointer identifying an initial buffer memory circuit of the corresponding sequence of buffer memory circuits. The method further comprises programming the first virtual channel circuit based on setting the start pointer for the first virtual channel circuit to be equal to the entry identifier of the initial buffer memory circuit. The method also comprises monitoring usage of the first virtual channel circuit to determine a reprogramming of the first virtual channel circuit. A length of the corresponding sequence of buffer memory circuits of the first virtual channel circuit is defined by the start pointer for a second virtual channel circuit subsequent to the first virtual channel circuit.

Another embodiment described herein is a buffer memory pool circuitry comprising a plurality of buffer memory circuits forming a buffer pool circuitry. The plurality comprises a first sequence of buffer memory circuits and a second sequence of buffer memory circuits. Each buffer memory circuit is configured to store an entry identifier comprising an identifier for the buffer memory circuit, a payload portion comprising a payload of data stored in the buffer memory circuit, and a next-entry pointer comprising an identifier for a next buffer memory circuit in a corresponding sequence of buffer memory circuits. The first sequence is allocated for a first virtual channel circuit comprising a first start pointer identifying the entry identifier for an initial buffer memory circuit of the first sequence. The second sequence is allocated for a second virtual channel circuit comprising a second start pointer identifying the entry identifier for an initial buffer memory circuit of the second sequence. A need to reprogram the first virtual channel circuit or the second virtual channel circuit is determined based on usage of the first virtual channel circuit and the second virtual channel circuit. A length of the first sequence of buffer memory circuits is defined by the second start pointer for the second virtual channel circuit. A final buffer memory circuit of the first sequence of buffer memory circuits precedes the initial buffer memory circuit of the second sequence of buffer memory circuits.

BRIEF DESCRIPTION OF DRAWINGS

So that the manner in which the features recited above can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 6A and 68B depict an example data flow indicating a level of granularity of redundancy provided by the buffer pool of FIGS. 3 and 4.

DETAILED DESCRIPTION

Figure 1:
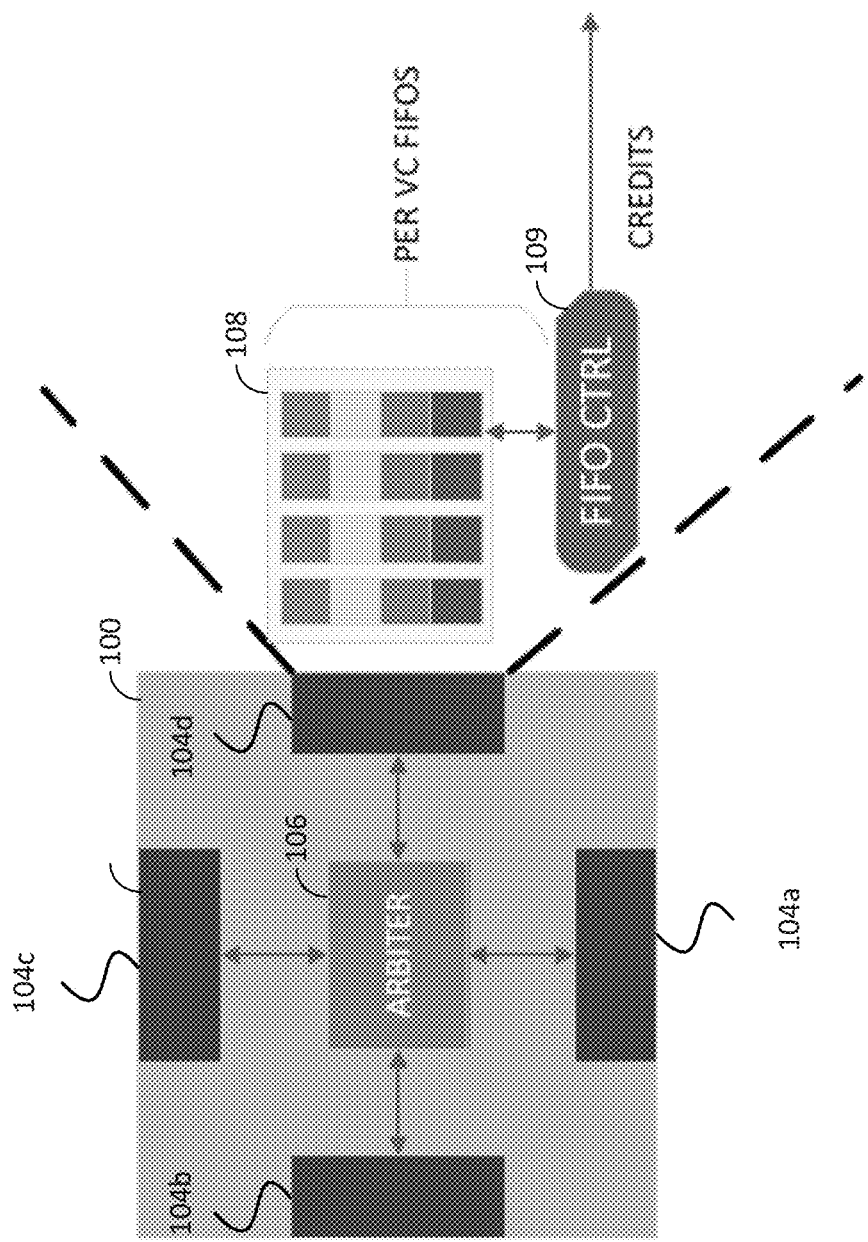
FIG. 1 is a block diagram of a representation of a Network-on-Chip (NoC) switch comprising multiple components, according to an example embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

A Network-on-Chip (NoC) is a semiconductor component used to connect one or more processors, memory systems, and other logical and corresponding components to enable data throughput between connected systems and components. In some embodiments, the NoC comprises NoC switches or similar switching components that employ first-in-first-out (FIFO) memory buffers to buffer data being routed through ports of the NoC switches. In some embodiments, the FIFO memory buffers may comprise a dedicated or fixed number of elements. For example, each NoC switch may comprise one or more ports having an assigned number of FIFO buffers, such as eight (8) FIFO buffers, each comprising a number of memory elements, such as five (5) memory elements, regardless of application and/or traffic mapping specifics. Each FIFO buffer may be associated with a virtual channel (VC).

Unfortunately, such fixed sized FIFO buffers can be underutilized because traffic routed through or mapped to ports of the NoC switches is generally not known when the FIFO buffers are sized and allocated. For example, when the NoC switch port comprises a number of FIFO buffers each having the size of 5 memory elements, the traffic mapped to utilizing a specific FIFO buffer will be mismatched anytime the amount of traffic either underutilizes the FIFO or over utilizes the FIFO.

Additionally, the fixed FIFO buffer size increases redundancy costs. Redundancy exists to enable continued operation of the FIFO buffer and corresponding NoC switch port in the event that there is a problem with one or more memory elements in one of the FIFO buffers. For example, if one of the FIFO buffers has a bad memory element, the corresponding FIFO buffer may not be usable for mapping traffic. However, because the FIFO buffers have fixed sizes, the smallest available granularity is the FIFO buffer. Therefore, the redundancy for a bad memory element in one of the FIFO buffers is allocating an entire other FIFO buffer in place of the FIFO buffer with the bad memory element. This results in a waste of the 4 good memory elements from that FIFO buffer. Additionally, the resource cost of the extra FIFO buffer used for redundancy is high (for example, at least the cost of 5 memory elements), there is generally one extra FIFO buffer per NoC switch port. Thus, each NoC switch port may accommodate a single need for redundancy, because once the extra FIFO buffer for the port is allocated, there is no redundant FIFO buffer available to accommodate a future bad memory element. Thus, the redundancy measures available with the FIFO buffers described above reduce efficiencies for the NoC switch and the NoC where redundancy measures are needed To cure the inefficiencies caused by the fixed size FIFO buffers and other port buffer structures, a buffer pool of programmable buffer elements can be programmed by a NoC compiler or controller to dynamically allocate FIFO buffers of varying sizes. The NoC compiler is able to identify statistics and other data for the port of the NoC switch and determine or predict traffic mappings for the port. Accordingly, the NoC compiler can program the buffer element allocations based on the predicted traffic mapping, which can result in increased efficiencies. Further, as the NoC compiler determines that additional or fewer buffer elements are needed for a FIFO buffer during operation, the NoC compiler can program and reallocate the buffer elements to resize the FIFO buffers as appropriate for the predicted traffic. Thus, the pool of programmable buffer elements can improve efficiencies for the NoC switch and the NoC.

In some instances, the NoC compiler can implement the FIFO buffer in software using a plurality of individual buffer elements in the buffer pool, where the individual buffer elements correspond to memory locations or storage elements. As such, the FIFO buffer can be implemented using the buffer pool where the FIFO buffer is programmable in size, the software defining the number of individual memory locations in the buffer pool available for the FIFO buffer. Such an implementation enables the FIFO buffer to be dynamically scalable in size based on various conditions, such as traffic requirements, available memory, and the like. Where the usage rate of the FIFO buffer fluctuates, the FIFO buffer can be redefined to employ a different, smaller or larger number of memory locations.

Such programmability provides a finer control over mapping and utilization of the FIFO buffer. For example, certain embodiments can utilize FIFO buffers of different sizes (as opposed to all the FIFO buffers being the same size for the NoC switch, as introduced above). These sizes of the individual FIFO buffers can be dynamically adapted based on the traffic being mapped to the FIFO buffers.

Additionally, such a buffer pool of memory locations that can be individually allocated provides improvements with respect to redundancy in the NoC switch. For example, if a FIFO buffer implemented with four consecutive buffer elements from the buffer pool has an element go bad, the buffer pool can simply provide a replacement buffer element and the buffer elements of the FIFO buffer can be remapped to exclude the bad element. Thus, for every buffer element that goes bad, use of only that buffer element is lost. Specifically, in a chain of elements 1→2→3→4 for an example FIFO buffer, buffer element 2 goes bad. In response to detection of the bad buffer element 2, the buffer pool can supply element 5 and the FIFO buffer can be remapped to 1→3→4→5. Thus, the buffer pool can simplify redundancies without requiring excess idle FIFO buffers.

The systems, methods, apparatus, and media described herein provide a buffering methodology for a Network-on- Chip (NoC) switch. A NoC comprises a collection of network interfaces, such as NoC master units and NoC slave units, denoted by NMU and NSU, respectively, and a collection of switches. The NoC can be used to connect various components and enables transfer to data between the connected components. More specifically, the network interfaces of the NoC connect master and slave components to the NoC. The primary function of the NoC may comprise routing traffic between the master (for example, processing system (PS) components) and slave (for example, a DDR controller) processing components on the NoC. In some embodiments, one or more processing components could act as master and slave. In other embodiments, one or more processing components could be plain master or plain slave processing components. Master operations can be realized through connecting the processing component to the NMU, while slave operations are realized by connecting the processing component to the NSU. Details of an exemplary NoC switch are provided with respect to FIG. 1.

FIG. 1 is a block diagram of a representation of a Network-on-Chip (NoC) switch 100 comprising multiple ports 104 in communication with an arbiter 106, according to an example embodiment. The NoC switch 100 includes four ports 104a-104d through which the NoC switch 100 is connected to at least one other component of the NoC or external to the NoC and through which data is transmitted or received by the NoC switch 100. The arbiter 106 coordinates routing of data through the NoC switch 100 via the ports 104a-104d. Each port 104 of the NoC switch 100 comprises a buffer, where the NoC switch 100 stores data as it is being routed through the NoC switch 100 via the corresponding port 104. An example buffer is shown with reference to the port 104d. The example buffer is shown is a FIFO buffer 108, which is controlled by a FIFO control circuitry 109. While the example embodiment described here comprises FIFO buffers 108, other types of buffers can similarly be used.

The buffer for each port 104 may comprise one or more first-in-first-out (FIFO) buffers 108 dedicated to one or more virtual channels (VCs) associated with that port 104. Each port 104 buffer may have a particular size, such as a size of 40 memory elements. These memory elements may be divided into the one or more FIFO buffers 108, each FIFO buffer 108 having a particular, fixed length or size (used interchangeably herein), such as a length of 5 memory elements. Thus, for the port 104, the total buffer of 40 memory elements and FIFO buffers 108 of size 5 memory elements means that the port 104 buffer includes 8 FIFO buffers 108.

A VC can correspond to a software thread for a single flow of traffic. Each VC flow can be mapped to one or more of the FIFO buffers 108 of a given port 104. Thus, a single physical channel or port 104 can be shared by multiple VC flows. With VCs, flow control across a physical channel of the port 104 can be non-blocking, meaning that while one FIFO buffer 108 is full and cannot accept any more transfers, a different FIFO buffer 108 for the port 104 that is not full can accept transfers, thereby avoiding any head-of-line blocking.

Because the FIFO buffer 108 have a fixed size of 5 memory elements and because all of the FIFO buffers 108 are of the same size (of 5 memory elements), the NoC switch 100 employing the FIFO buffers 108 experience various disadvantages. For example, predicting what size of FIFO buffer 108 (for example, the number of memory elements in the FIFO buffer 108) will enable full or high bandwidth for the corresponding VC and port 104 traffic mapping is difficult. In some embodiments, when the FIFO buffer 108 is allocated, the future traffic mapping for the NoC switch 100 and corresponding ports 104 is unknown. Thus, the FIFO buffer 108 for the NoC switch 100 may be over-allocated for some VCs while being under-allocated for other VCs.

For example, a NoC compiler (which may correspond to a controller circuitry, processor circuitry, or similar component that controls FIFO buffer 108 allocation, NoC switch 100 traffic mapping, and the like) may select routes for traffic through the NoC switch 100 that does not result in mapping traffic to one or more VCs of a port 104 of the NoC switch 100 while mapping excess traffic to another port 104. Such a routing can result in over-utilization of FIFO buffers 108 in some ports 104 (for example, the port 104 having excess mapped traffic) and under-utilization of FIFO buffers 108 in other ports 104 (for example, the port 104 with no mapped traffic) of NoC switches 102. This can cause significant performance and efficiency losses to the NoC switch 102. For example, such over- and under-utilization can result in corresponding NoC switch 100 area (for example, component area, and the like) and power overhead. Such an example is discussed in more detail with respect to FIG. 2.

Figure 2:
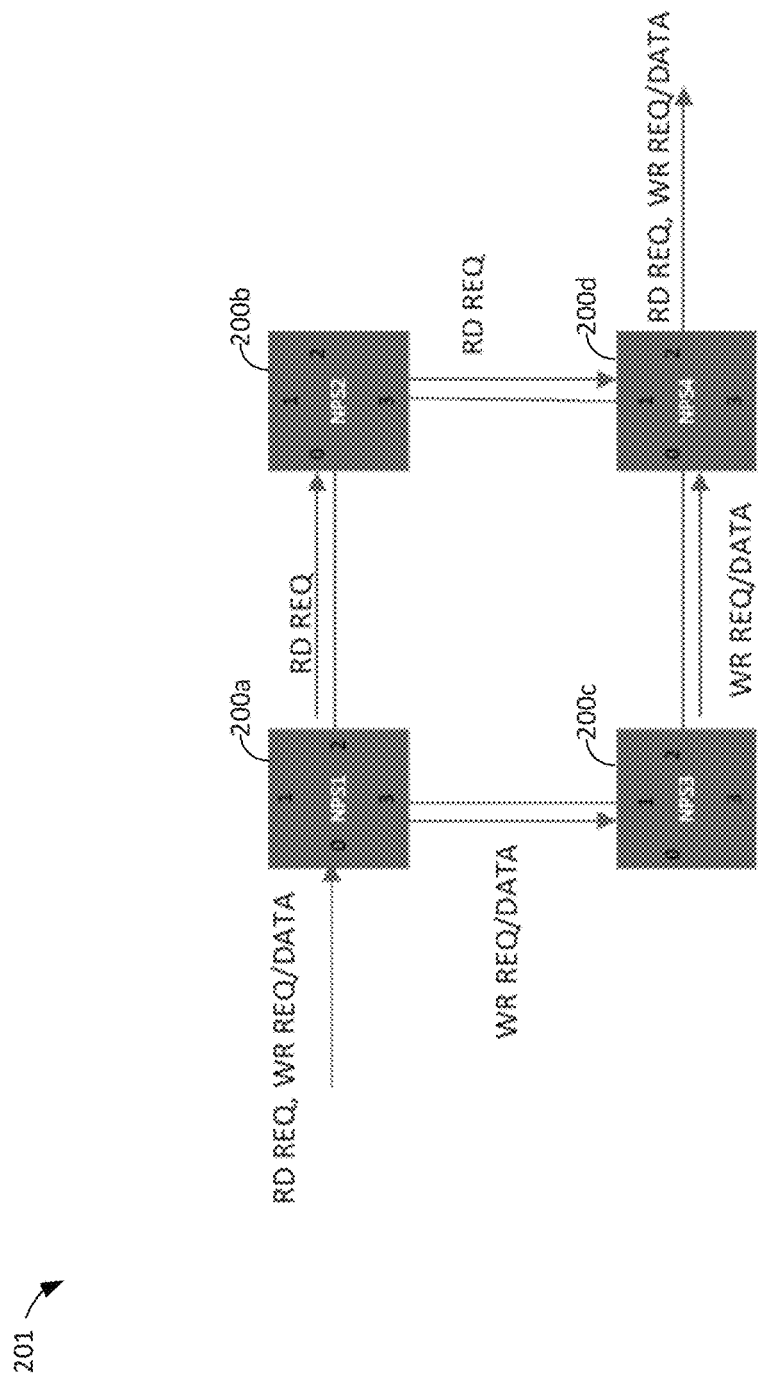
FIG. 2 depicts a block diagram showing a representative flow of data through a representative NoC switch, with virtual channel buffer usage indicated for example data read/write requests.

FIG. 2 depicts a block diagram of a traffic map 201 showing a representative arrangement of NoC switches 200a-200d through which a read request and a write request are mapped. The NoC switches 200a-200d correspond to the NoC switch 100 of FIG. 1. The NoC compiler (not shown) may route the read and write requests along different paths through a first NoC switch 200a to a destination NoC switch 200d through NoC switches 200b and 200c. Such routing may be assigned based on available port bandwidth for each switch 200, and the like.

In this example, only port 0 of the first NoC switch 200a and port 2 of the NoC switch 200d utilize VCs for both the read and write requests, where port 0 of the NoC switch 200a receives both the read request and the write request and the port 2 of the NoC switch 200d conveys both the read request and the write request. The remaining ports of the NoC switches 200a, 200b, 200c, and 200d route only one of the read or write requests (for example, ports 2 and 3 of NoC switch 200a, ports 0 and 3 of NoC switch 200b, ports 1 and 2 of NoC switch 200c, and ports 0 and 1 of NoC switch 200d) or neither of the read or write requests, as shown in the traffic map 201, and therefore under-utilize these ports. Assuming that each port of the NoC switches 200a-200d comprises the FIFO buffer allocations, as introduced above with respect to FIG. 1, each NoC switch 200 port comprises the FIFO buffers to accommodate both the read and write requests, as seen by the NoC switch 200a port 0 and NoC switch 200d port 2 having the FIFO buffers to route both requests. However, since the majority of the ports for the NoC switches 200a-200d route one or neither request, the majority of the ports are under-utilized. For example, assuming that the NoC switch 200a port 0 and NoC switch 200d port 2 fully utilize the corresponding FIFO buffers to route both the read request and the write request, the ports that route only one or neither of the read request and the write request (ports 1-3 of NoC switch 200a, ports 0-3 of NoC switches 200b and 200c, and ports 0, 1, and 3 of NoC switch 200d) are under-utilized.

Turning back to the discussion regarding the NoC switch 100 of FIG. 1, each port 104 has a smallest granularity at the FIFO buffer 108 level, meaning that no smaller block of memory or storage than the FIFO buffer 108 can be individually mapped or managed. This smallest granularity of the FIFO buffer 108 limits the smallest granularity available for the corresponding VC to be the FIFO buffer 108. For example, where the FIFO buffer 108 has a size of 5 memory elements, the smallest granularity is 5 memory elements, meaning that no fewer than 5 memory elements (for example, no less than a single FIFO buffer 108) can be allocated to a VC.

This granularity impacts how well utilized the FIFO buffer 108 is for various traffic mappings as well as redundancy options for the FIFO buffer 108 and the corresponding NoC switch 100. Generally, finer granularity enables allocation of smaller blocks of memory elements. Thus, large granularity can result in poor allocation of memory for small amounts of data. For example, one redundancy option for storage entities, such as buffers, is having an extra or backup buffer. When implementing this redundancy option in the FIFO buffer, the backup buffer for the FIFO buffer 108 is limited to the size of the FIFO buffer 108, so redundancy for each port 104 of the NoC switch 100 can only be provided at the FIFO buffer 108 level. This means that if a single memory element in one of the FIFO buffers 108 is bad, because the smallest manipulatable is the FIFO buffer 108, the entire FIFO buffer comprising the single bad memory element must be replaced or remapped. That entire FIFO buffer 108 must be discarded and becomes no longer usable, creating excess waste (for example, the remaining 4 good memory elements in that FIFO buffer 108). Changing the level of granularity available for redundancy to be smaller than the FIFO buffer 108 may involve considerable re-design.

Furthermore, incorporating redundancy, even at the FIFO buffer 108 level, may utilize additional logic for the NoC switch 100 or the NoC compiler dedicated to redundancy operations (for example, transfer of traffic and operations when redundancy is implemented, switching between buffers, and so forth). Additionally, the NoC switch 100 of FIG. 1 cannot easily accommodate traffic patterns that employ more or fewer VCs than available for each of the ports 104 of the NoC switch 100.

The buffer pool systems described herein assign buffer elements to buffers, such as FIFO buffers. The buffer pool systems allow buffer-depths of each VC to be controlled through programmable registers and adds redundancy support. In some embodiments, the buffer pool system exists for each port of a NoC switch or a single buffer pool system exists for an entire NoC switch.

The buffer pool systems enable construction of FIFO buffers with various depths or sizes as opposed to the equal size FIFO buffers 108 described above. For example, the NoC compiler can optimize or change buffer sizes per NoC switch port based on and to suit performance requirements for the NoC switch dynamically. For example, with respect to the embodiment described relative to FIG. 2, the port 0 of the NoC switch 200a and the port 2 of the NoC switch 200d include a mapping for both read and write requests, while the remaining ports for the NoC switches 200a-200d have a read request, a write request, or no request mapped. Using the buffer pool system for the NoC switches 200a, the corresponding NoC compilers for each NoC switch 200 can configure the corresponding FIFO buffers for the corresponding ports to be appropriately sized to be fully utilized to route mapped traffic. Thus, the NoC compiler for the NoC switch 200a may allocate the FIFO buffer for the port 0 to be able to route both the read and write requests while the ports 2 and 3 are allocated FIFO buffers sized to route just the read request and the write request, respectively, and the port 1 is allocated no FIFO buffers since it has no traffic. Thus, the buffer pool system enables the NoC compiler to dynamically adjust the depth (or size) of the FIFO buffers for a port according to assigned traffic. This dynamic, programmable re-allocation of buffers can increase the performance and efficiency of the NoC switch.

In some embodiments, the buffer pool systems described herein are easily integrated with NoC switches with minimal or no changes to operations or specifics of the remainder of the NoC switch. For example, the same or similar buffer elements can be used with the buffer pool system that are currently used with the fixed size FIFO buffers. The added, dynamic allocation functionality can be applied in software by the NoC compiler, or similar processing or control component. Thus, the buffer pool systems can replace current buffer architectures such as the fixed FIFO buffer 108 with the buffer pool, or similar, architecture. In some instances, such replacement can be a plug-and-play type replacement where the existing fixed size FIFO buffers 108 are replaced with the buffer pool system with no other changes to the corresponding NoC switch.

Furthermore, the buffer pool systems enable allocation of buffers and per VC buffer allocations according to demand, statistical information, traffic maps, and the like. In some embodiments, the NoC compiler can monitor traffic mappings and determine a need for changes to the buffer pool allocation on the fly, where the changes are implemented when the NoC switch 100 is idle or inactive. Similarly, the buffer pool systems may provide built-in redundancy, or redundancy that is inherent to the structure and nature of the buffer pool systems. For example, because the buffer pool system allocates buffer elements to FIFOs and other buffer types at the buffer element level, the buffer pool system can provide redundancy at the buffer element level as well by simply reallocating a buffer element as needed. Thus, a single bad buffer element in a FIFO buffer can be replaced instead of having to replace the entire FIFO buffer.

Figure 3:
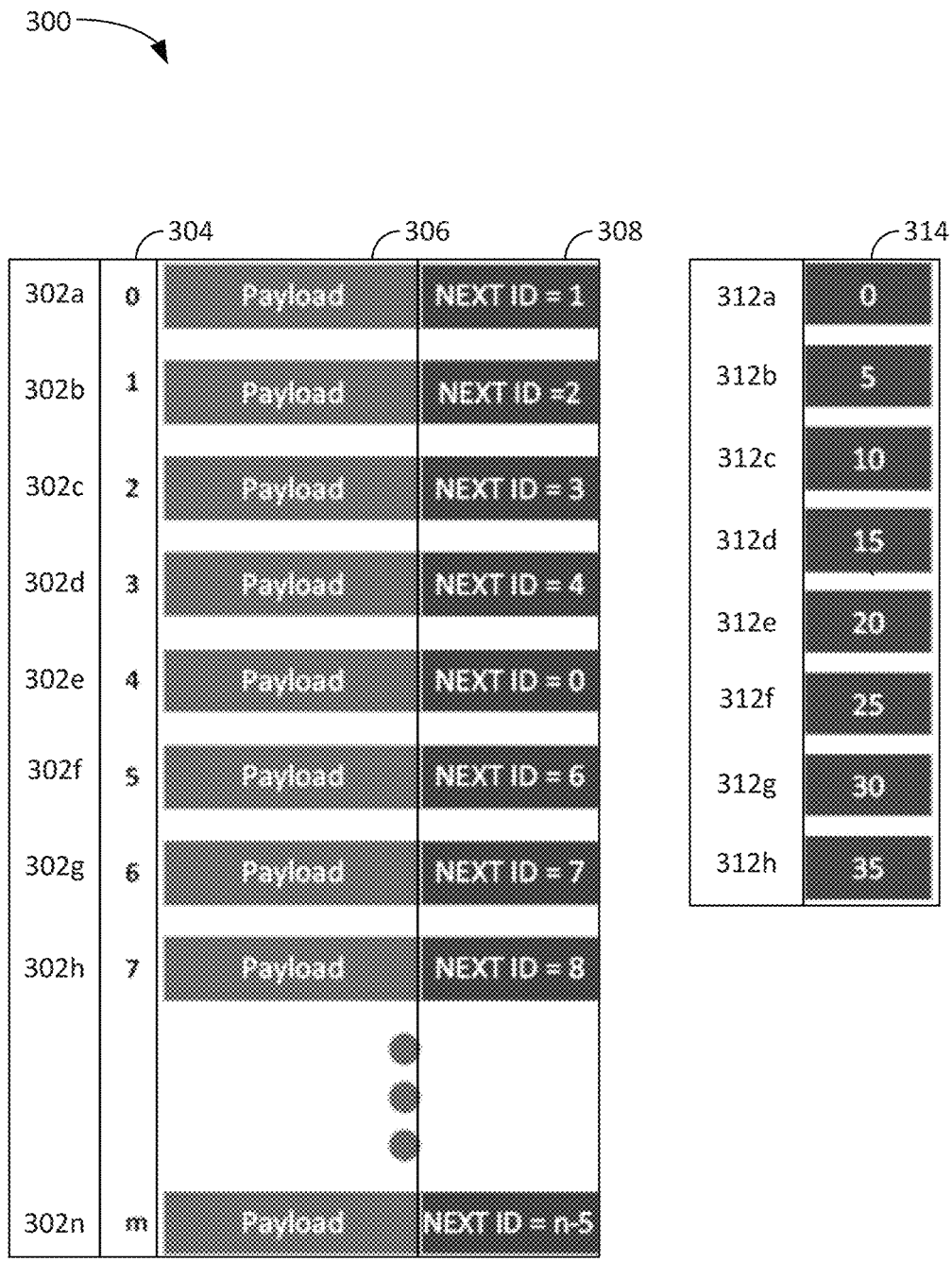
FIG. 3 depicts an example of a buffer pool of programmable buffer elements associated with corresponding virtual channels (VCs).

FIG. 3 depicts an example of a buffer pool 300 of programmable buffer elements 302 associated with or allocated to corresponding VCs 312. Each buffer element 302 comprises a field for each of a statically allocated entry identifier 304, a payload portion 306, and a programmable next element pointer 308. The buffer elements 302 may be configured or allocated in a sequence of one or more consecutive or nonconsecutive buffer elements 302 to create a FIFO buffer, corresponding to the FIFO buffer 108 of FIG. 1, of variable or dynamic length. Each VC 312 may comprise a programmable start pointer 314 identifying the identifier of the first buffer element 302 in the VC 312. While the embodiments described herein relate to FIFO buffers, the buffer pool system described herein can dynamically allocate buffer elements in any corresponding buffer structures and types.

As introduced above, the buffer pool 300 comprises a plurality of n buffer elements 302. The buffer elements 302 may each have the statically allocated identifier in the entry identifier 304 of a number between 0 and m, where m=n−1. For example, where the buffer pool 300 includes 40 buffer elements 302, the buffer elements 302 will each include a unique identifier between 0 and 39. Each buffer element 302 further comprises a payload portion 306 for storing a payload or data in the buffer element 302. The payload portion 306 may comprise a fixed size for all buffer elements 302. Finally, the next element pointer 308 of each buffer elements identifies a next buffer element 302 in the buffer comprising a sequence of buffer elements 302.

As introduced above, the VCs 312 identify the sequences of buffer elements 302 that allocated as, for example, FIFO buffers. For example, the VC 312a comprises a start pointer 314a identifying the buffer element 302 having the start entry identifier of '0'. Thus, the VC 312a starts at buffer element 302a. Similarly, the VC 312b has a start pointer 314b value of '5', meaning the VC 312b starts at buffer element 302f. This also designates that the VC 312a has a buffer length of 5 buffer elements 302 (for example, the start pointer 314b value of '5' minus the start pointer 314a value of '0'). As shown in the buffer pool 300, each VC 312a-312h has a buffer length of 5 buffer elements 302, indicated by each of the VCs 312 having a start pointer that is 5 buffer elements greater than the previous VC 312 and assuming a total of 40 buffer elements 302 in the buffer pool 300.

For an example FIFO buffer associated with the VC 312a, the FIFO buffer has a length of 5 buffer elements (as described above). The FIFO buffer associated with the VC 312a is thus formed from buffer elements 302a-302e, where the first buffer element 302a has a next element pointer 308a pointing to the identifier of the buffer element 302 with the entry identifier of '1', which is the buffer element 302b. Similarly, the buffer element 302b points to the buffer element 302 entry identifier '2', which is the buffer element 302c. The buffer element 302c next element pointer points to the buffer element 302d with entry identifier '3', which points to the buffer element 302e having entry identifier '4'. The buffer element 302e completes the loop because its next element point 308e points back to the first buffer element 302a by identifying entry identifier '0'.

As described above, the NoC compiler can monitor traffic analytics and other information to attempt to predict or identify changes that should be made to the allocation of buffer elements 302 to one or more FIFO buffers for a VC 312 or the corresponding port. In some embodiments, when a FIFO buffer is continuously underutilized, the NoC compiler can determine to reduce a size of the FIFO buffer by reallocating one or more buffer elements 302 from the FIFO buffer. On the other hand, if a FIFO buffer is determined to be undersized for the traffic mapped to it, then the NoC compiler can reallocate additional buffer elements 302 to the FIFO buffer. In either case, the NoC compiler can determine an appropriate size for the FIFO buffer and reallocate the corresponding buffer elements 302 accordingly, for example, at the next idle or quiesce period for the NoC switch.

When the NoC switch is quiesced, the NoC compiler may program one or more of the next element pointer 308 in one or more of the buffer elements 302 and the start pointer 314 in the VC 312 to change an existing FIFO buffer. Adjusting the next element pointer 308 in the one or more buffer elements 302 may change the length of the FIFO buffer allocated from the buffer elements 302. Adjusting the start pointer 314 of the VC 312 may update the length of corresponding FIFO buffers. An example of such changes programmed by the NoC compiler are provided below with respect to FIG. 4.

Figure 4:
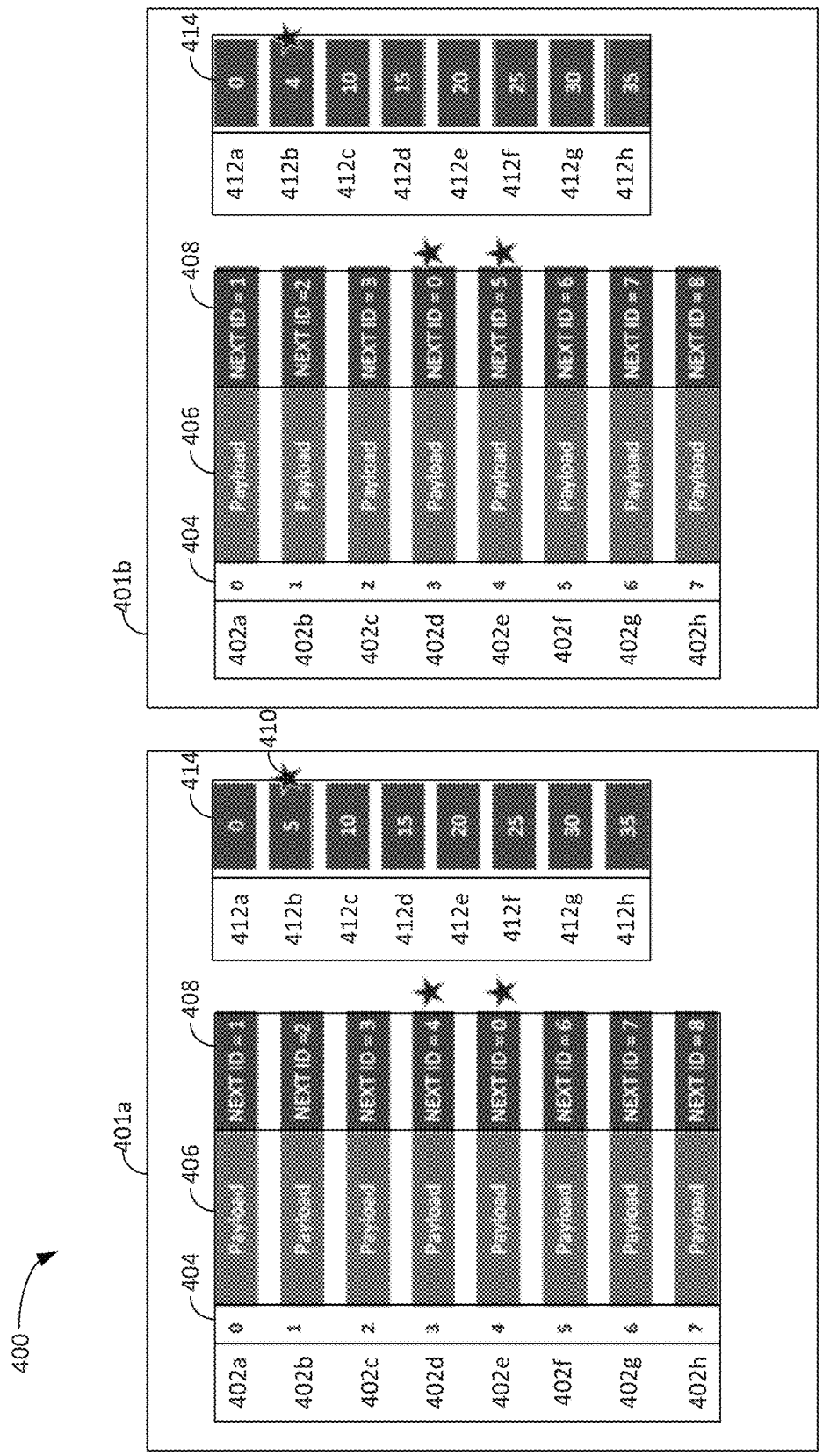
FIG. 4 depicts how the buffer elements of the buffer pool of FIG. 3 can be dynamically programmed for a particular use case, according to an example embodiment.

FIG. 4 depicts how buffer elements 402 of a buffer pool 400 can be dynamically programmed for a particular use case, according to an example embodiment. The buffer pool 300 corresponds to the buffer pool 400 of FIG. 4. Corresponding components and features between the buffer pools 300 and 400 have corresponding functionality and operations, and so forth. Thus, for such components in the buffer pool 400 that correspond to the components in the buffer pool 300, corresponding description will not be duplicated for brevity.

The buffer pool 400 shows how buffer elements 402 can be programmed from a first state 401a to a second state 401b. In the first state 401a, the buffer elements 402 of the buffer pool 400 are programmed in 5-buffer element buffers, as described with reference to FIG. 3 before the programming of the buffer pool for the second state 401b.

In some embodiments, the NoC compiler, as introduced above, determines that the buffers are not being utilized in the most efficient manner in the first state 401a and are to be reallocated. For example, the NoC compiler determines to change the sizes or allocations for the FIFO buffers associated with VC 412a and 412b to reduce the allocation of the FIFO buffer associated with VC 412a from 5 buffer elements 402 to 4 buffer elements 402. The NoC compiler also determines to increase the allocation of the FIFO buffer associated with VC 412b from 5 buffer elements 402 to 6 buffer elements 402. The first and second states 401a and 401b, respectively, include indicators 410 identifying those aspects of the buffer pool 400 that are programmed between the first state 401a and the second state 401b.

The second state 401b shows the buffer pool 400 allocations post programming by the NoC compiler. Specifically, to reduce the buffer elements 402 allocated to the VC 412a, the NoC compiler programs the start pointer 414b of the VC 412b to change it from identifying the buffer element 402f to identifying the buffer element 402e, for example, by changing the start pointer 414b of the VC 412b from '5' to '4'. As described above, this reduces a length of the VC 412a from 5 elements to 4 elements (start pointer 414b value of '4' minus the start pointer 414a value of '0'). The NoC compiler makes corresponding changes to the buffer elements 402 that are allocated to the VCs 412a and 412b. For example, the NoC compiler programs the next element pointer 408d of the buffer element 402d from '5' to '0' to give the FIFO buffer loop corresponding to the VC 412a the 4 buffer element 402 length instead of the previous 5 buffer element 402 length. The NoC compiler also programs the next element pointer 408e of the buffer element 402e from '0' to '6' to give the FIFO buffer loop corresponding to the VC 412b 6 buffer elements 402 instead of the previous 5 buffer elements 402. Though not shown, the NoC compiler also programs the next element pointer for the buffer element 402j to point to the buffer element 402e with value '5' as opposed to the previous value of '6'. Thus, via the programming, the NoC compiler can dynamically reallocate FIFO buffer elements 402 in corresponding VCs to improve efficiencies of communications for the NoC switch. For example, by reducing the length of the FIFO buffer associated with the VC 412a, the NoC compiler can improve utilization for the FIFO buffer.

As introduced above, where the NoC compiler is configured to individually allocate buffer elements from a buffer pool, the buffer pool can also support dynamic redundancy for buffers at the buffer element level. Such granularity with respect to redundancy reduces inefficiencies inherent in redundancy allocations in fixed size buffers, as discussed above. For example, where redundancies of the FIFO buffer 108 resulted in full, 5 element buffers being used to replace a FIFO buffer having a single bad buffer element (as described above), such buffer level granularity is inefficient. For example, the other 4 buffer elements in the FIFO buffer having the 1 bad buffer element are unusable once replaced even though they are not bad. Details of the redundancies using the smaller buffer element granularity provided by the buffer pool systems described herein are described below with respect to FIGS. 5A-6.

Figure 5A:
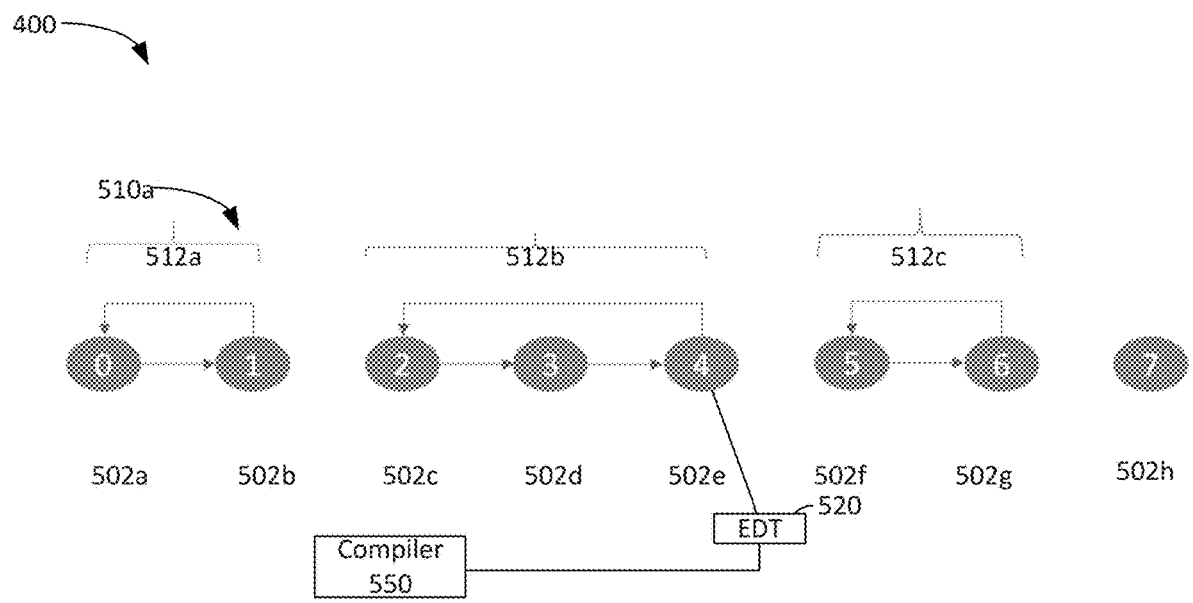
FIG. 5A shows an example data flow for a first-in-first-out (FIFO) buffer formed from the buffer pool of FIG. 3B.
Figure 5B:
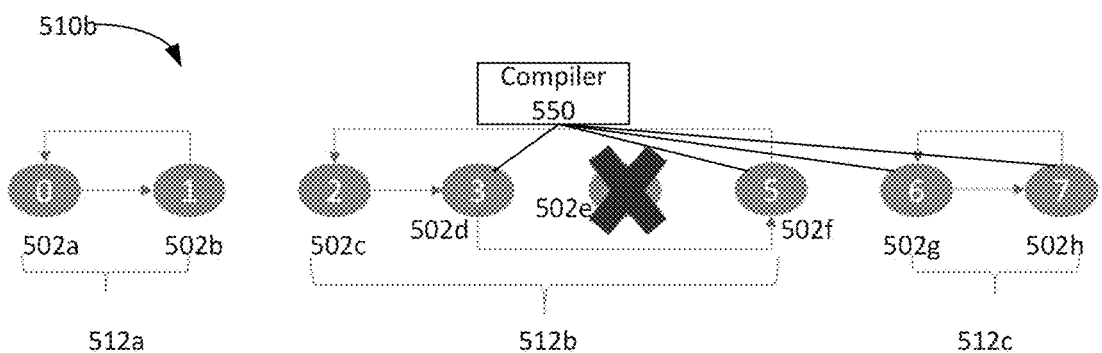
FIG. 5B shows an example data flow indicating how the buffer pool can provide redundancy to the FIFO buffer of FIG. 5A.

FIG. 5A shows an example arrangement 510a of first-in-first-out (FIFO) buffers allocated for VCs 512a-512c from buffer elements 502, corresponding to the buffer elements 302 of FIG. 3. FIG. 5B shows an example arrangement 510b indicating how the buffer elements 502 forming the arrangement 510a can be programmed to provide redundancy for the FIFO buffers allocated to the VCs 512a-512c. In some embodiments, though not explicitly shown, consecutive buffer elements 502 are linked. A compiler 550 may assign or specify VC 512 assignments. For example, if no buffer element is bad, the consecutive buffer elements 502 will remain linked consecutively. The compiler 550 can then program or assign particular buffer elements 502 as one or more VC 512, and change such assignment as appropriate later.

Specifically, the arrangement 510a shows a first VC 512a comprising buffer elements 502a and 502b, a second VC 512b having buffer elements 502c-502e, and a third VC 512e comprising buffer elements 502f and 502g. Buffer element 502h is not allocated to any VC 512 and is available for redundancy, if needed.

In the arrangement 510b, the buffer element 502e is determined to be bad, faulted, or otherwise unusable. For example, one or more of an embedded deterministic test (EDT) architecture 520, the NoC compiler 550 (corresponding to the NoC compiler described above), or other monitoring circuitry may determine that the buffer element 502e is bad and request or initiate one or more redundancy methods. In some embodiments, the buffer is bad post chip manufacturing. In some embodiments, the NoC compiler 550 initiates redundancy methods when the IC is activated after manufacture. In some embodiments, where the implementation of the redundancy methods may impact one or more other VCs 512, the NoC compiler 550 waits for the one or more other VCs 512 to be idle before implementing the redundancy methods.

The redundancy method comprises programming the FIFO buffer including the bad buffer element 502e (and the corresponding VC 512b) to not use, or skip, the bad buffer element 502e. Skipping the bad buffer element 502e involves programming the buffer element 502d that points to the bad buffer element 502e to point instead to a good buffer element 502 in the sequence of buffer elements 502 after the bad buffer element 502e, here the buffer element 502f. Thus, the NoC compiler 550 programs the next element pointer (corresponding to the next element pointer 308 and 408) for the buffer element 502d to point to the buffer element 502f, thereby skipping the bad buffer element 502e. The NoC compiler 550 then updates the buffer element 502f to create the loop for the VC 512. Therefore, the NoC compiler also programs the next element pointer of the buffer element 502f to point back to the buffer element 502c, which is the first buffer element 502 in the FIFO buffer associated with the VC 512b, to copy the next element pointer of the bad buffer element 502e. In this way, the VC 512b is repaired. Additionally, because the VC 512c is impacted by reallocating the buffer element 502f (that was previously part of the FIFO buffer associated with the VC 512c) to the FIFO buffer associated with the VC 512b, the NoC compiler 550 programs the buffer element 502g as the first buffer element 502 of the VC 512c and programs the next element pointer for the buffer element 502g to identify the previously unallocated buffer element 502h as the second buffer element 502 in the FIFO buffer associated with the VC 512c. Additionally, the NoC compiler 550 programs the start pointer for the VC 512c to point to the buffer element 502g instead of the buffer element 502f. Thus, the NoC compiler 550 efficiently reallocates buffer elements 502 to provide redundancy to the VCs 512 based on the buffer element 502 granularity.

In some embodiments, the NoC compiler 550 implements the redundancy method such that the bad buffer element 502e is replaced with the subsequent good buffer element 502f, as shown in FIGS. 5A and 5B. In certain embodiments, this may involve the NoC compiler 550 updating previously working FIFO buffers to accommodate the redundancy. In certain other embodiments, the NoC compiler 550 implements redundancy such that the bad buffer element 502e is replaced with the unallocated buffer element 502h. This would reduce the number of updates performed by the NoC compiler 550, where other VCs 512 and corresponding FIFO buffers would not be affected by the redundancy method. For example, by replacing the bad buffer element 502e with the unused buffer element 502h, the NoC compiler 550 would not have to reprogram any aspect of the VC 512c or the corresponding FIFO buffer. An example of this is provided below with respect to FIGS. 6A and 6B.

Figures 6A, 6B:
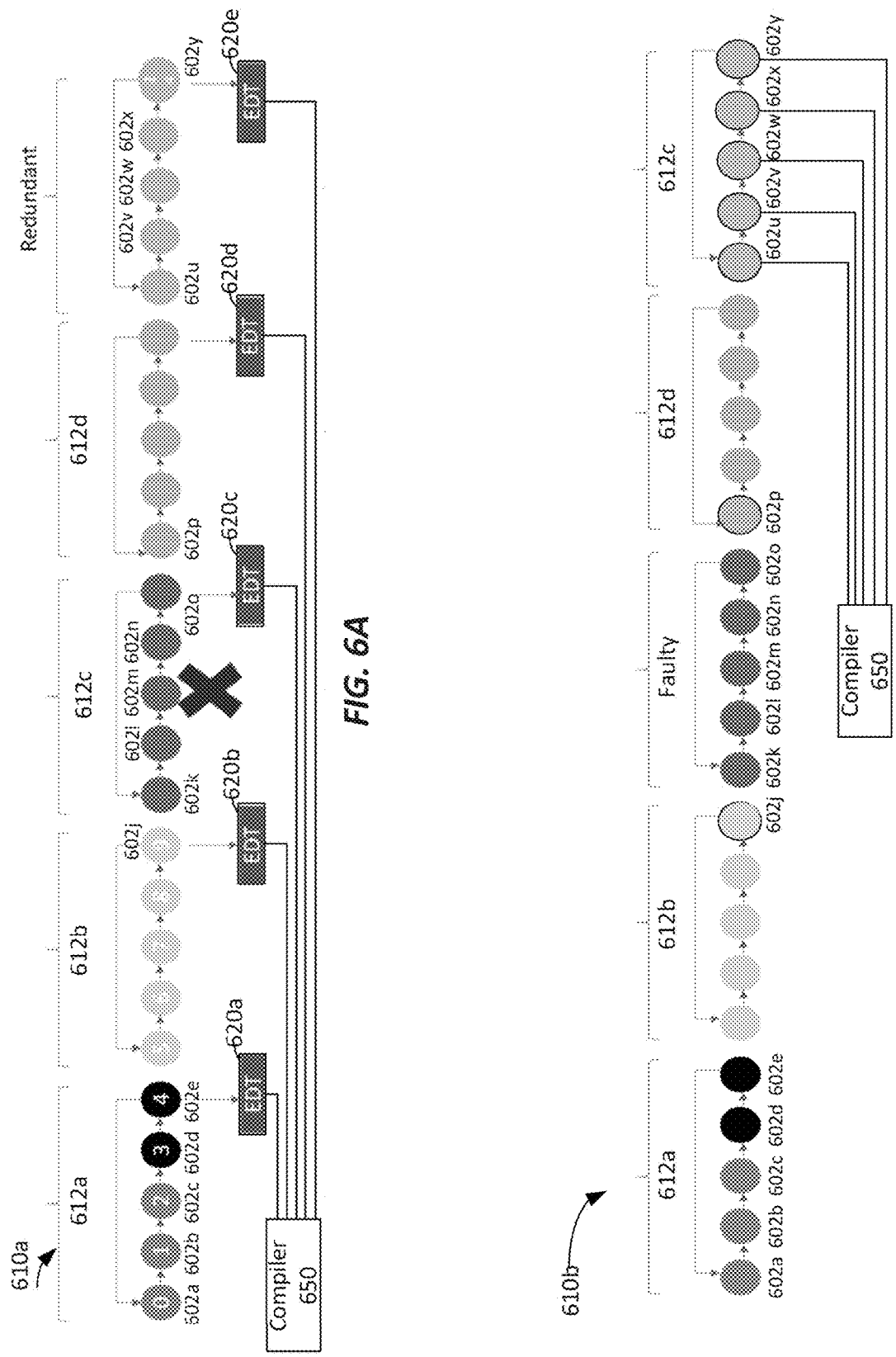

An important aspect of the buffer pooling system described herein is that redundancy is built in. For example, consider a switch port buffer having a faulty buffer element. Depending on the available granularity of redundancy, the NoC compiler programs a different buffer element in the next element pointer of the buffer element pointing to the faulty buffer element with absolutely no change to the design of the buffer pool or the corresponding NoC switch. The implementation of redundancy may be limited by detection capabilities of the NoC switch (for example, a number of EDTs or similar monitoring circuitry associated with the buffer elements) and with no bearing on the hardware of the NoC switch or its design. This is contrary to the FIFO buffer implementations employing fixed sized FIFO buffers described above, where implementing a finer granularity than the FIFO buffer would incur considerable overhead in terms of hardware costs as the FIFO buffers will have to be completely re-designed. FIGS. 6A and 6B below provides another example data flow indicating how the buffer pool can provide redundancy to a FIFO buffer.

FIG. 6A shows an example arrangement 610a of first-in-first-out (FIFO) buffers allocated for VCs 612a-612d from buffer elements 602, corresponding to the buffer elements 302 of FIG. 3. FIG. 6B shows an example arrangement 610b indicating how the buffer elements 602 forming the arrangement 610a can be programmed to provide redundancy for the FIFO buffers allocated to the VCs 612a-612d. The VCs 612 may correspond to the VCs 312.

The arrangement 610 shows VCs 612a-612d each having FIFO buffers of 5 buffer elements 602 allocated thereto. Specifically, the VC 612a includes buffer elements 602a-602e, VC 612b includes buffer elements 602f-602j, VC 612c includes buffer elements 602k-602o, and VC 612d includes buffer elements 602p-602t. Buffer elements 602u-602y are unallocated. Each FIFO buffer includes an EDT circuitry 620 that determines whether one or more of the buffer elements of the corresponding FIFO buffer is faulty or bad. In some embodiments, the EDT circuitry 620 is configured to determine that a particular buffer element 602 is faulty or that one of the buffer elements 602 of the coupled FIFO buffer is faulty. For example, the EDT 620c associated with the buffer elements 602k-602o (and the VC 612c) may determine that one of the buffer elements 602k-602o is faulty or may determine that the specific buffer element 602m is faulty. The EDT 620c may pass an indication of the faulty buffer element 602m to the NoC compiler 650.

In response to the indication of the faulty buffer element 602m (or that a faulty buffer element 602 exists in the FIFO buffer comprising buffer elements 602k-602o), the NoC compiler 650 may replace the FIFO buffer comprising the faulty buffer element 602 with the sequence of redundant buffer elements 602u-602y. Specifically, the NoC compiler 650 may program each of the buffer elements 602u-602y to form the FIFO buffer associated with the VC 612c. Additionally, the NoC compiler 650 may program the VC 612c to identify the buffer element 602c as the first element (for example, with a start pointer of the VC 612).

In some embodiments, the flexibility of the NoC compiler 650 with respect to granularity and implementation of redundancy is associated with the EDT 620. For example, when the EDT 620 can only identify that a buffer element 602 of the FIFO buffer monitored by the EDT 620 is faulty without being able to identify the specific buffer element 602, then the NoC compiler 650 is limited to replacing the entire FIFO buffer upon detection of the faulty buffer element 602. Thus, as shown in FIG. 6B, the arrangement 610 shows that the FIFO buffer comprising the faulty buffer element 602m is identified as faulty and replaced with the previously redundant buffer elements 602u-602y programmed as the FIFO buffer associated with the VC 612c. The buffer pool system comprising additional EDTs 620 or improved functionality of EDTs 620 to determine which buffer element 602 forming the FIFO buffer is faulty may introduce finer grained redundancy only the faulty entry needs to be isolated.

In some embodiments, the redundancy provided by the buffer pool comprising the buffer elements, such as the buffer elements 502 and 602, is configurable. For example, FIGS. 5A and 5B depict redundancy at the buffer element level, while FIGS. 6A and 6B depict redundancy provided at the FIFO level. Additional levels of redundancy can be provided by the buffer pool and buffer elements, and levels greater than the FIFO or between the buffer element and FIFO levels.

Figure 7:
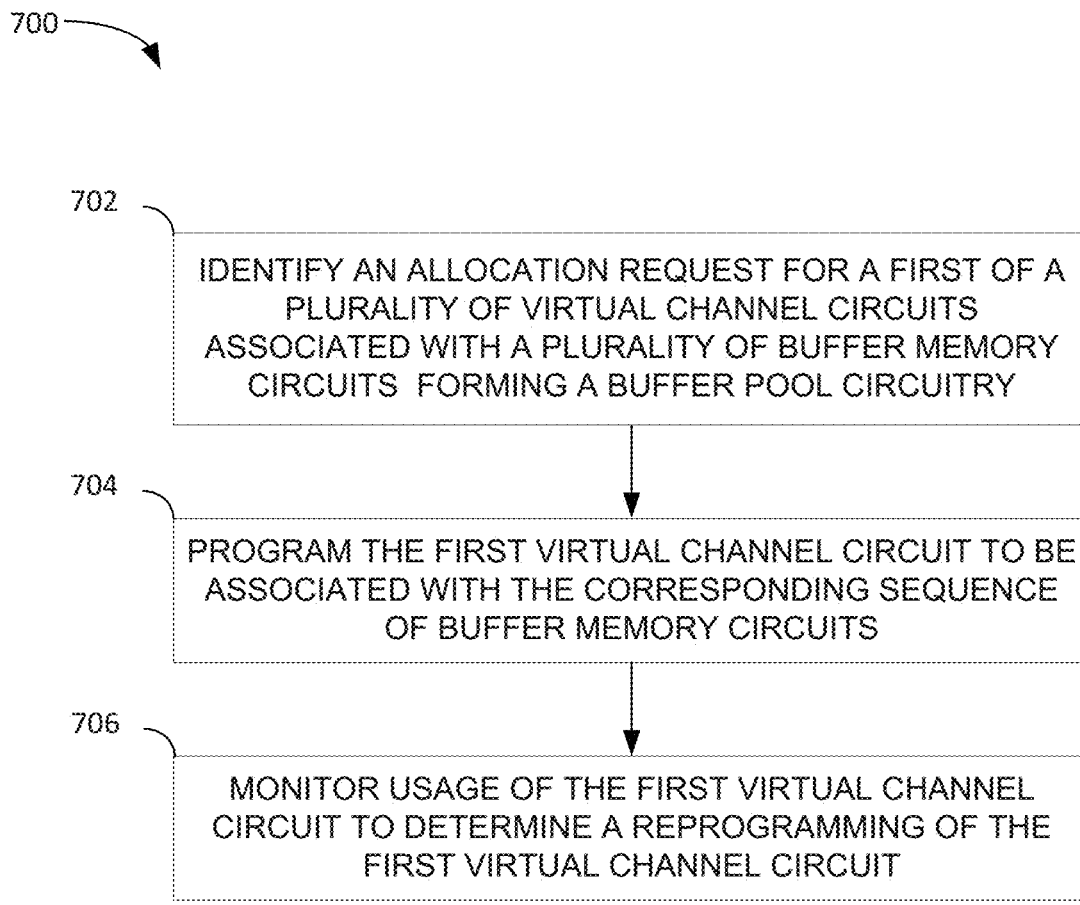
FIG. 7 depicts a flowchart for a method of allocating FIFO buffers from a pool of buffer elements, according to an exemplary embodiment.

FIG. 7 is a flowchart of a method 700 of allocating FIFO buffers from a pool of buffer elements such as the buffer elements 302-502 of FIGS. 3-5, according to an example embodiment. In general, the method 700 can be used to dynamically program buffers for NoC switch ports, such as the ports 104 of the NoC switch 100. In certain embodiments, steps of the method 700 can be performed in any order, additional steps can be added, or steps can be removed.

At block 702, a NoC compiler or similar controller identifies an allocation request for a first of a plurality of virtual channel circuits (corresponding to the VCs 312 and 412) associated with a plurality of buffer memory circuits (corresponding to the buffer elements 302, 402, and 502) forming a buffer pool circuitry. Each buffer memory circuit may be configured to store an entry identifier (corresponding to the entry identifier 304 and 404), a payload portion (corresponding to the payload portion 306 and 406), and a next-entry pointer (corresponding to the next element pointer 308 and 408). Each of the plurality of virtual channel circuits may be associated with a corresponding sequence of buffer memory circuits. Each of the plurality of virtual channel circuits may comprise a start pointer (corresponding to the start pointer 314 and 414) identifying the entry identifier (i.e., the entry identifier 304 and 404) for an initial or first buffer memory circuit of the corresponding sequence of buffer memory circuits.

At block 704, the NoC compiler programs the first virtual channel circuit to be associated with the corresponding sequence of buffer memory circuits. The NoC compiler may program the first virtual channel circuit based on setting the start pointer for the first virtual channel circuit to be equal to the entry identifier of the initial buffer memory circuit of the corresponding sequence of buffer memory circuits.

At block 706, the NoC compiler monitors usage of the first virtual channel circuit to determine a reprogramming of the first virtual channel circuit.

In some embodiments, a length of the corresponding sequence of buffer memory circuits of the first virtual channel circuit is defined by the start pointer for a second of the plurality of virtual channel circuits subsequent to the first virtual channel circuit.

In some embodiments, the method 700 further comprises identifying a reprogram request to change an aspect of the first virtual channel circuit and the corresponding sequence of buffer memory circuits. Furthermore, the method 700 may comprise determining (1) an update pointer value to the start pointer for the second virtual channel circuit and (2) an update ID value to the next-entry pointer for a terminal buffer memory circuit of the corresponding sequence of buffer memory circuits based on the identified reprogram request. In some embodiments, the method 700 comprises updating the start pointer for the second virtual channel circuit based on the update pointer value and updating the next-entry pointer for the terminal buffer memory circuit of the corresponding sequence of buffer memory circuits of the first virtual channel circuit based on the update ID value. In certain embodiments, the method 700 comprises monitoring usage of the first virtual channel circuit to determine a subsequent reprogramming of the first virtual channel circuit.

In some embodiments, the method 700 further comprises updating the next entry pointer for the initial buffer memory circuit of the corresponding sequence of buffer memory circuits for the second virtual channel based on the update of the start pointer for the second virtual channel circuit. In some embodiments, the start pointer for the second virtual channel circuit corresponds to the entry identifier of the initial buffer memory of the corresponding sequence of buffer memory circuits for the second virtual channel circuit that is subsequent to the corresponding sequence of buffer memory circuits for the first virtual channel circuit. In some embodiments, the corresponding sequence of buffer memory circuits for each of the plurality of virtual channel circuits is implemented as a first-in-first-out (FIFO) buffer. In some embodiments, the entry identifier comprises an identifier for the buffer memory circuit, the payload portion comprises a payload of data stored in the buffer memory circuit, and the next-entry pointer comprises an identifier for a next buffer memory circuit in the corresponding sequence of buffer memory circuits.

In some embodiments, the method 700 further comprises determining that a second buffer memory circuit of the corresponding sequence of buffer memory circuits for the first virtual channel circuit is faulted and to be bypassed. The method 700 also comprises updating the next-entry pointer for the initial buffer memory circuit of the corresponding sequence for the first virtual channel circuit to identify the entry identifier for a next usable buffer memory circuit subsequent to the second buffer memory circuit of the corresponding sequence of buffer memory circuits. In some instances, the method 700 comprises updating the next-entry point for a terminal buffer memory circuit of the corresponding sequence of buffer memory cells to identify the entry identifier for a new terminal buffer memory circuit of the corresponding sequence of buffer memory circuits and updating the next-entry point for the new terminal buffer memory circuit to identify the entry identifier for the initial buffer memory circuit of the corresponding sequence of buffer memory circuits.

Figure 8A:
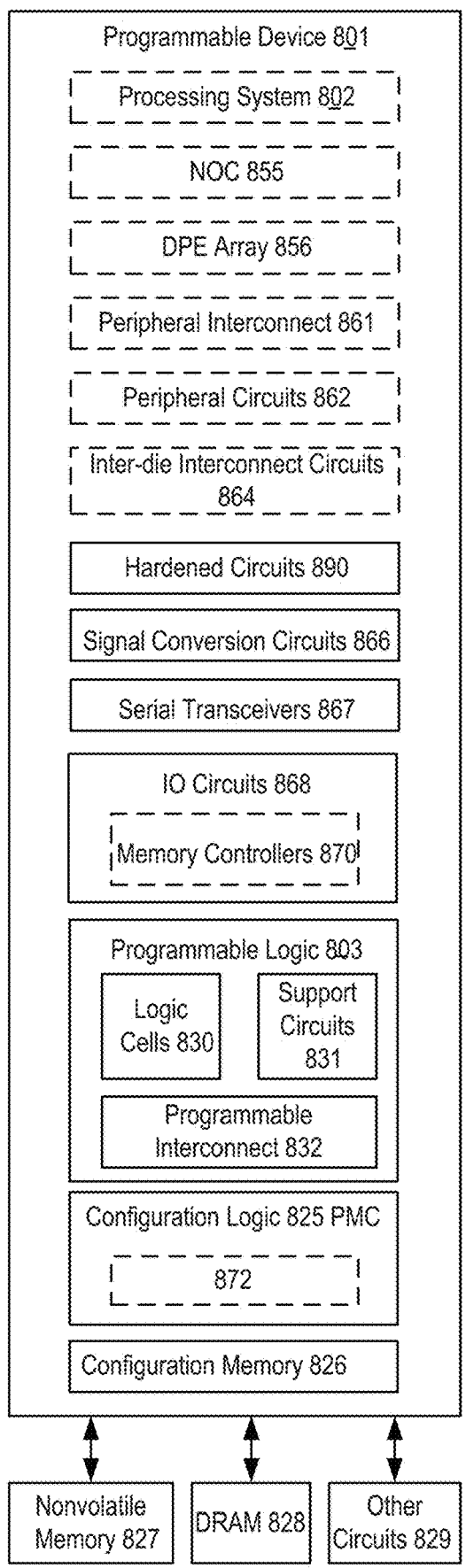
FIG. 8A is a block diagram depicting a programmable IC according to an example.

FIG. 8A is a block diagram depicting a programmable device 801 according to an example. The programmable device 801 includes programmable logic (PL) 803 (also referred to as a programmable fabric), input/output (IO) circuitries 868, serial transceivers 867, signal conversion circuitries 866, hardened circuitries 890, configuration logic 825, and configuration memory 826. The programmable device 801 can be coupled to external circuitries, such as nonvolatile memory 827, dynamic random access memory (DRAM) 828, and other circuitries 829. In various examples, the programmable device 801 further includes a processing system (PS) 802, a network-on-chip (NoC) 855 (for example, corresponding to the NoC comprising the NoC switch 100 described above), a data processing engine (DPE) array 856, peripheral interconnect 861, peripheral circuitries 862, and inter-die interconnect circuitries 864.

The PL 803 includes logic cells 830, support circuitries 831, and programmable interconnect 832. The logic cells 830 include circuitries that can be configured to implement general logic functions of a plurality of inputs. For example, the logic cells 830 may implement one or more of the NoC compiler discussed above in FIGS. 1-7. The support circuitries 831 include dedicated circuitries, such as digital signal processors, memories, and the like. In some embodiments, such support circuitries 831 may provide the NoC compiler or similar functionality as described herein. The logic cells 830 and the support circuitries 831 can be interconnected using the programmable interconnect 832. Information for programming the logic cells 830, for setting parameters of the support circuitries 831, and for programming the programmable interconnect 832 is stored in the configuration memory 826 by the configuration logic 825. The configuration logic 825 can obtain the configuration data from the nonvolatile memory 827 or any other source (e.g., the DRAM 828 or from the other circuitries 829). In some examples, the configuration logic 825 includes a platform management controller (PMC) 872. The PMC 872 is configured to boot and configure the subsystems of the programmable device 801, such as the PL 803, the PS 802, the NoC 855, the DPE array 856, the signal conversion circuitries 866, the hardened circuitries 890, and the like.

The IO circuitries 868 provide an external interface for the subsystems of the programmable device 801, such as the PL 803, the PS 802, and the like. In some examples, the IO circuitries 868 include memory controllers 870 configured to interface external memories (e.g., the DRAM 828). Other connectivity circuitries can include the peripheral interconnect 861, the peripheral circuitries 862, and the inter-die interconnect circuitries 864. The peripheral interconnect 861 includes bus interface circuitries, such as peripheral component interconnect express (PCIe) circuitries and the like. The peripheral circuitries 862 include universal serial bus (USB) ports, Ethernet ports, universal asynchronous transceiver (UART) ports, serial peripheral interface (SPI) ports, general purpose IO (GPIO) ports, serial advanced technology attachment (SATA) ports, and the like. The inter-die interconnect circuitries 864 include circuitries configured to interface like inter-die interconnect circuitries in other programmable device(s) (e.g., for when the programmable device 801 is one die in a multi-die integrated circuit package). The serial transceivers 867 include high-speed transmit/receive circuitries configured to provide an external IO interface for the programmable device 801.

The PS 802 can include microprocessor(s), memory, support circuitries, IO circuitries, and the like. The NoC 855 is configured to provide for communication between subsystems of the programmable device 801, such as between the PS 802, the PL 803, the hardened circuitries 890, and the DPE array 856. The DPE array 856 can include an array of DPE's configured to perform data processing, such as an array of vector processors. The signal conversion circuitries 866 include analog-to-digital converters (ADCs) and digital-to-analog converters (DACs).

The hardened circuitries 890 comprise circuitries with predetermined functionality. A given hardened circuitry 890 can include one or more predetermined functions. Example hardened circuitries 890 include filters, mixers, sample-rate converters, transforms circuitries, and the like. A hardened circuitry 890 can be programmable to configure specific predetermined functionalities or select among predetermined functionalities. However, in contrast to a circuitry in the PL 803, a hardened circuitry 890 cannot be configured or reconfigured with different functionality. For example, a hardened circuitry 890 can include a filter having two predetermined and selectable functionalities. A third functionality cannot be added to the hardened circuitry 890, nor can one of the two functionalities be removed from the hardened circuitry 890. In contrast, a filter configured in the PL 803 can be reconfigured to add one more additional functionalities or to remove one or more functionalities. Further, a filter configured in the PL 803 can be removed entirely and replaced with another circuitry. In contrast, a hardened circuitry 890 cannot be removed from the programmable device 801 (but can be unused if desired).

Figure 8B:
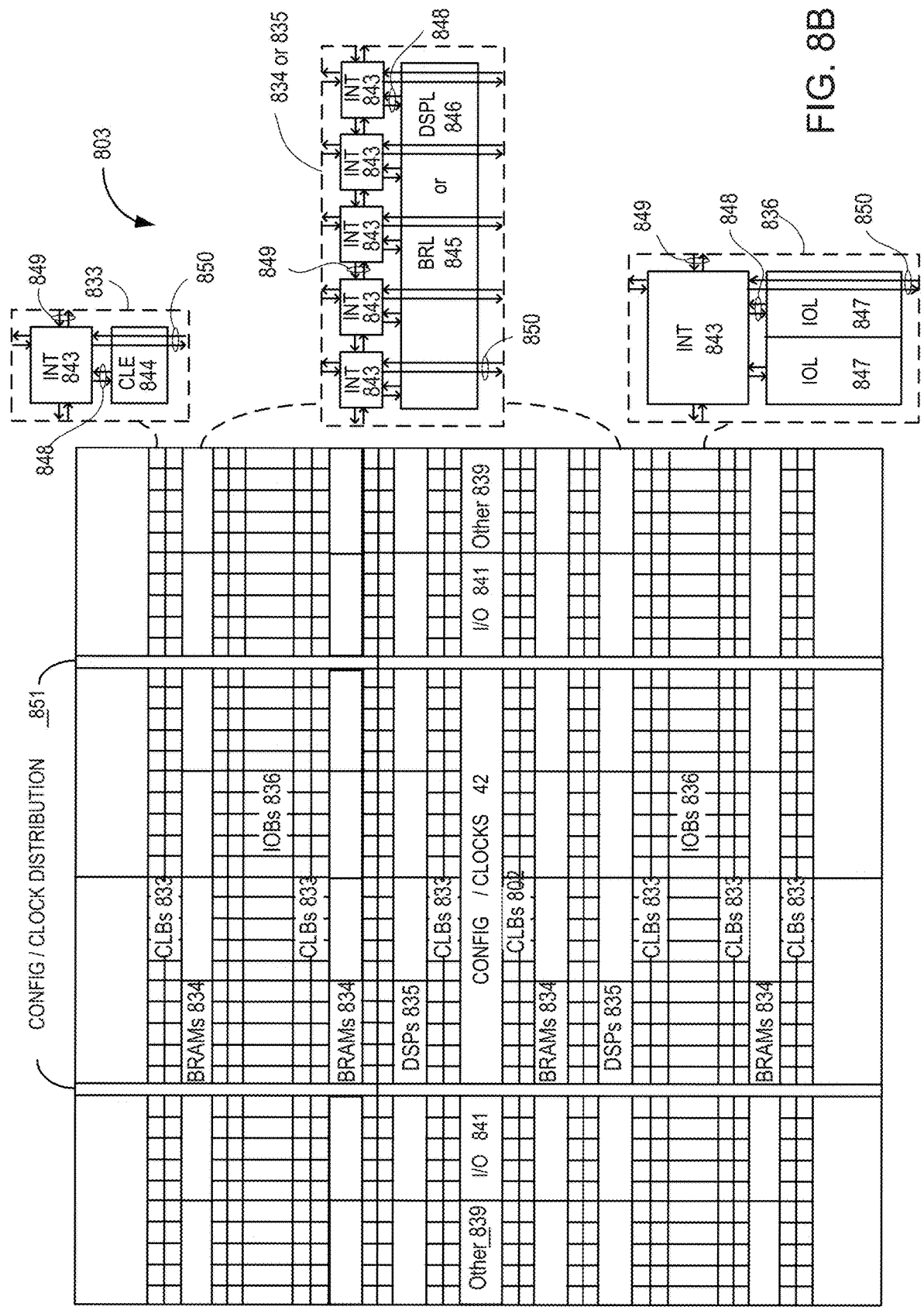
FIG. 8B illustrates a field programmable gate array (FPGA) implementation of a programmable IC according to an example.

FIG. 8B illustrates a field programmable gate array (FPGA) implementation of the PL 803 according to an example. The PL 803 shown in FIG. 8B can be used in any example of the programmable devices described herein. The PL 803 includes a large number of different programmable tiles including configurable logic blocks ("CLBs") 833, random access memory blocks ("BRAMs") 834, input/output blocks ("IOBs") 836, configuration and clocking logic ("CONFIG/CLOCKS") 842, digital signal processing blocks ("DSPs") 835, specialized input/output blocks ("I/O") 841 (e.g., configuration ports and clock ports), and other programmable logic 839 such as digital clock managers, analog-to-digital converters, system monitoring logic, and so forth.

In some PLs 803, each programmable tile can include at least one programmable interconnect element ("INT") 843 having connections to input and output terminals 848 of a programmable logic element within the same tile, as shown by examples included at the top of FIG. 8B. Each programmable interconnect element 843 can also include connections to interconnect segments 849 of adjacent programmable interconnect element(s) in the same tile or other tile(s). Each programmable interconnect element 843 can also include connections to interconnect segments 850 of general routing resources between logic blocks (not shown). The general routing resources can include routing channels between logic blocks (not shown) comprising tracks of interconnect segments (e.g., interconnect segments 850) and switch blocks (not shown) for connecting interconnect segments. The interconnect segments of the general routing resources (e.g., interconnect segments 850) can span one or more logic blocks. The programmable interconnect elements 843 taken together with the general routing resources implement a programmable interconnect structure ("programmable interconnect") for the illustrated PL.

In an example implementation, a CLB 833 can include a configurable logic element ("CLE") 844 that can be programmed to implement user logic plus a single programmable interconnect element ("INT") 843. A BRAM 834 can include a BRAM logic element ("BRL") 845 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 835 can include a DSP logic element ("DSPL") 846 in addition to an appropriate number of programmable interconnect elements. An IOB 836 can include, for example, two instances of an input/output logic element ("IOL") 847 in addition to one instance of the programmable interconnect element 843. As will be clear to those of skill in the art, the actual I/O pads connected, for example, to the I/O logic element 847 typically are not confined to the area of the input/output logic element 847.

In the pictured example, a horizontal area near the center of the die (shown in FIG. 88) is used for configuration, clock, and other control logic. Vertical columns 851 extending from this horizontal area or column are used to distribute the clocks and configuration signals across the breadth of the PL.

Some PLs utilizing the architecture illustrated in FIG. 8B include additional logic blocks that disrupt the regular columnar structure making up a large part of the PL. The additional logic blocks can be programmable blocks and/or dedicated logic.

Note that FIG. 8B is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 8B are purely exemplary. For example, in an actual PL more than one adjacent row of CLBs is typically included wherever the CLBs appear, to facilitate the efficient implementation of user logic, but the number of adjacent CLB rows varies with the overall size of the PL.

Figure 8C:
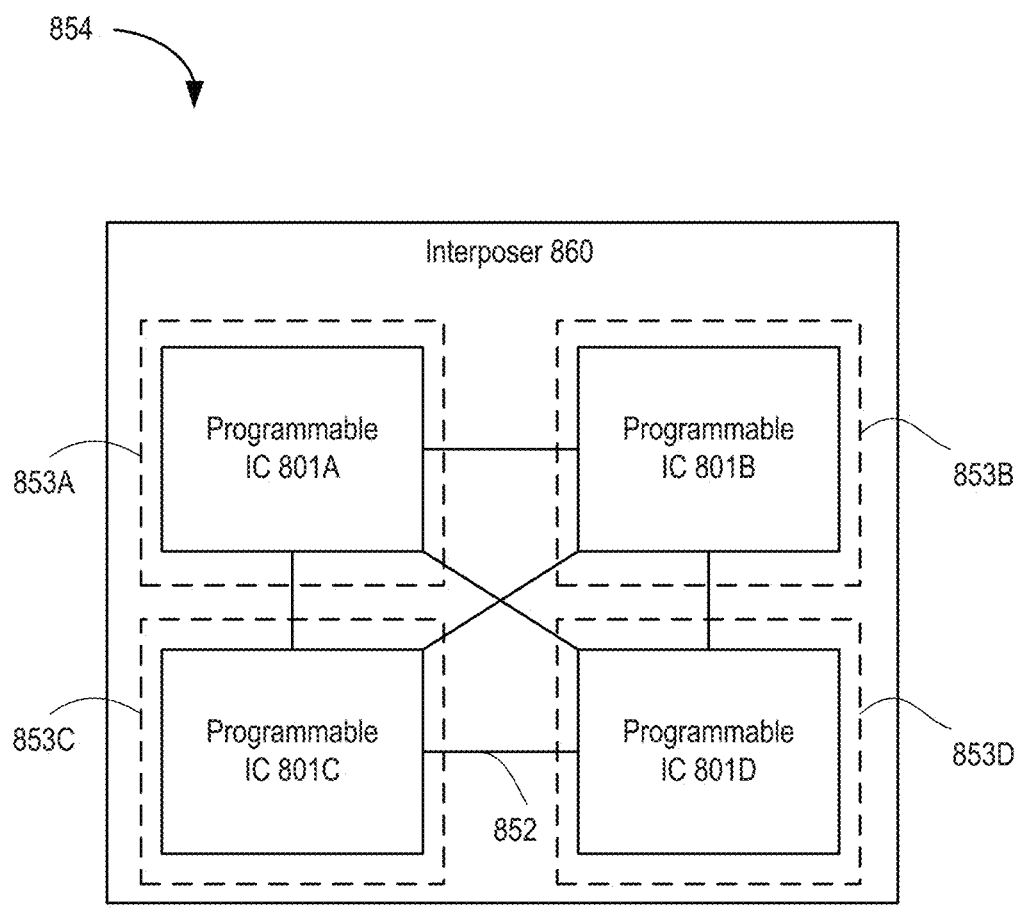
FIG. 8C is a block diagram depicting a multi-integrated circuit (IC) programmable device according to an example.

FIG. 8C is a block diagram depicting a multi-die programmable device 854 according to an example. The multi-die programmable device 854 includes a plurality of programmable devices 801, e.g., programmable devices 801A, 801B, 801C, and 801D. In an example, each programmable device 801 is an IC die disposed on an interposer 860. Each programmable device 801 comprises a super logic region (SLR) 853 of the programmable device 854, e.g., SLRs 853A, 853B, 853C, and 853D. The programmable devices 801 are interconnected through conductors on the interposer 860 (referred to as super long lines (SLLs) 52) and inter-die interconnect circuitries 864 disposed within each of the programmable devices 801. The programmable ICs could form the NoC compiler described above in FIGS. 1-6C.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or apparatus, and the like. Accordingly, aspects may take the form of an entirely hardware embodiment or a combination of hardware products or an embodiment combining hardware aspects with corresponding programming that may all generally be referred to herein as a "circuitry" or "system." Furthermore, certain aspects, such as programmable logic blocks, lookup tables (LUTs), and the like, may take the form of hardware components that can be controlled using corresponding programming.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations or programming for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and apparatuses according to various examples of the present invention. In this regard, each block in the flowchart or block diagrams may represent a circuitry, programming for such circuitry, or portion of instructions for such circuitry, which comprises one or more executable instructions for controlling or programming the circuitry to perform the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A buffer memory pool circuitry, comprising:
   a plurality of buffer memory circuits forming a buffer pool circuitry, each buffer memory circuit configured to store an entry identifier, a payload portion, and a next-entry pointer; and
   a processor circuitry configured to:
      identify an allocation request for a first virtual channel circuit of a plurality of virtual channel circuits associated with the plurality of buffer memory circuits, each of the plurality of virtual channel circuits associated with a corresponding sequence of buffer memory circuits and comprising a start pointer identifying the entry identifier for an initial buffer memory circuit of the corresponding sequence of buffer memory circuits,
      program the first virtual channel circuit to be associated with the corresponding sequence of buffer memory circuits based on setting the start pointer for the first virtual channel circuit to be equal to the entry identifier of the initial buffer memory circuit of the corresponding sequence of buffer memory circuits, and
      update the next-entry pointer of a buffer memory circuit of the corresponding sequence of buffer memory circuits for the first virtual channel circuit, to reprogram the first virtual channel circuit, based on determining a fault within the corresponding sequence of buffer memory circuits for the first virtual channel circuit,
   wherein a length of the corresponding sequence of buffer memory circuits of the first virtual channel circuit is defined by a start pointer for a second virtual channel circuit of the plurality of virtual channel circuits subsequent to the first virtual channel circuit.

2. The buffer memory pool circuitry of claim 1, wherein the processor circuitry is further configured to:
   identify a reprogram request to change an aspect of the first virtual channel circuit and the corresponding sequence of buffer memory circuits,
   determine an update pointer value to the start pointer for the second virtual channel circuit and an update ID value to the next-entry pointer for a terminal buffer memory circuit of the corresponding sequence of buffer memory circuits based on the identified reprogram request;
   update the start pointer for the second virtual channel circuit based on the update pointer value;
   update the next-entry pointer for the terminal buffer memory circuit of the corresponding sequence of buffer memory circuits of the first virtual channel circuit based on the update ID value; and
   monitor usage of the first virtual channel circuit to determine a subsequent reprogramming of the first virtual channel circuit.

3. The buffer memory pool circuitry of claim 2, wherein the processor circuitry is further configured to update the next-entry pointer for the initial buffer memory circuit of the corresponding sequence of buffer memory circuits for the second virtual channel circuit based on the update of the start pointer for the second virtual channel circuit.

4. The buffer memory pool circuitry of claim 1, wherein the start pointer for the second virtual channel circuit corresponds to the entry identifier of the initial buffer memory circuit of the corresponding sequence of buffer memory circuits for the second virtual channel circuit that is subsequent to the corresponding sequence of buffer memory circuits for the first virtual channel circuit.

5. The buffer memory pool circuitry of claim 1, wherein the corresponding sequence of buffer memory circuits for each of the plurality of virtual channel circuits is implemented as a first-in-first-out (FIFO) buffer.

6. The buffer memory pool circuitry of claim 1, wherein:
   the entry identifier comprises an identifier for a respective buffer memory circuit,
   the payload portion comprises a payload of data stored in the respective buffer memory circuit, and
   the next-entry pointer comprises an identifier for a next buffer memory circuit in the corresponding sequence of buffer memory circuits.

7. The buffer memory pool circuitry of claim 1, wherein determining the fault within the corresponding sequence of buffer memory circuits for the first virtual channel circuit comprises determining that a second buffer memory circuit of the corresponding sequence of buffer memory circuits for the first virtual channel circuit is faulted and to be bypassed, wherein updating the next-entry pointer of the buffer memory circuit of the corresponding sequence of buffer memory circuits for the first virtual channel circuit comprises updating the next-entry pointer for the initial buffer memory circuit of the corresponding sequence of buffer memory circuits for the first virtual channel circuit to identify the entry identifier for a next usable buffer memory circuit subsequent to the second buffer memory circuit of the corresponding sequence of buffer memory circuits, and wherein the processor circuitry is further configured to:
- update the next-entry pointer for a terminal buffer memory circuit of the corresponding sequence of buffer memory circuits to identify the entry identifier for a new terminal buffer memory circuit of the corresponding sequence of buffer memory circuits; and
- update the next-entry pointer for the new terminal buffer memory circuit to identify the entry identifier for the initial buffer memory circuit of the corresponding sequence of buffer memory circuits.

8. The buffer memory pool circuitry of claim 1, wherein the plurality of buffer memory circuits of the buffer pool circuitry provides a redundancy that is configurable with respect to at least one of a size in a number of buffer memory circuits or a level of the buffer pool circuitry.

9. A method of allocating buffers, the method comprising:
identifying an allocation request for a first virtual channel circuit of a plurality of virtual channel circuits associated with a plurality of buffer memory circuits forming a buffer pool circuitry, each buffer memory circuit configured to store an entry identifier, a payload portion, and a next-entry pointer, each of the plurality of virtual channel circuits associated with a corresponding sequence of buffer memory circuits and comprising a start pointer identifying the entry identifier for an initial buffer memory circuit of the corresponding sequence of buffer memory circuits;
programming the first virtual channel circuit to be associated with the corresponding sequence of buffer memory circuits based on setting the start pointer for the first virtual channel circuit to be equal to the entry identifier of the initial buffer memory circuit of the corresponding sequence of buffer memory circuits; and
updating the next-entry pointer of a buffer memory circuit of the corresponding sequence of buffer memory circuits for the first virtual channel circuit, to reprogram the first virtual channel circuit, based on determining a fault within the corresponding sequence of buffer memory circuits for the first virtual channel circuit,
wherein a length of the corresponding sequence of buffer memory circuits of the first virtual channel circuit is defined by the start pointer for a second virtual channel circuit of the plurality of virtual channel circuits subsequent to the first virtual channel circuit.

10. The method of claim 9, further comprising:
identifying a reprogram request to change an aspect of the first virtual channel circuit and the corresponding sequence of buffer memory circuits;
determining an update pointer value to the start pointer for the second virtual channel circuit and an update ID value to the next-entry pointer for a terminal buffer memory circuit of the corresponding sequence of buffer memory circuits based on the identified reprogram request;
updating the start pointer for the second virtual channel circuit based on the update pointer value;
updating the next-entry pointer for the terminal buffer memory circuit of the corresponding sequence of buffer memory circuits of the first virtual channel circuit based on the update ID value; and
monitoring usage of the first virtual channel circuit to determine a subsequent reprogramming of the first virtual channel circuit.

11. The method of claim 10, further comprising updating the next-entry pointer for the initial buffer memory circuit of the corresponding sequence of buffer memory circuits for the second virtual channel circuit based on the update of the start pointer for the second virtual channel circuit.

12. The method of claim 9, wherein the start pointer for the second virtual channel circuit corresponds to the entry identifier of the initial buffer memory circuit of the corresponding sequence of buffer memory circuits for the second virtual channel circuit that is subsequent to the corresponding sequence of buffer memory circuits for the first virtual channel circuit.

13. The method of claim 9, wherein the corresponding sequence of buffer memory circuits for each of the plurality of virtual channel circuits is implemented as a first-in-first-out (FIFO) buffer.

14. The method of claim 9, wherein:
the entry identifier comprises an identifier for the respective buffer memory circuit,
the payload portion comprises a payload of data stored in the respective buffer memory circuit, and
the next-entry pointer comprises an identifier for a next buffer memory circuit in the corresponding sequence of buffer memory circuits.

15. The method of claim 9, wherein determining the fault within the corresponding sequence of buffer memory circuits for the first virtual channel circuit comprises determining that a second buffer memory circuit of the corresponding sequence of buffer memory circuits for the first virtual channel circuit is faulted and to be bypassed, wherein updating the next-entry pointer of the buffer memory circuit of the corresponding sequence of buffer memory circuits for the first virtual channel circuit comprises updating the next-entry pointer for the initial buffer memory circuit of the corresponding sequence of buffer memory circuits for the first virtual channel circuit to identify the entry identifier for a next usable buffer memory circuit subsequent to the second buffer memory circuit of the corresponding sequence of buffer memory circuits and wherein the method further comprises:
updating the next-entry pointer for a terminal buffer memory circuit of the corresponding sequence of buffer memory circuits to identify the entry identifier for a new terminal buffer memory circuit of the corresponding sequence of buffer memory circuits; and
updating the next-entry pointer for the new terminal buffer memory circuit to identify the entry identifier for the initial buffer memory circuit of the corresponding sequence of buffer memory circuits.

16. A buffer memory pool circuitry, comprising:
a plurality of buffer memory circuits forming a buffer pool circuitry, the plurality comprising:
a first sequence of buffer memory circuits, and
a second sequence of buffer memory circuits, wherein:
each buffer memory circuit of the first and second sequences is configured to store an entry identifier, a payload portion, and a next-entry pointer,
the entry identifier comprising an identifier for the buffer memory circuit,
the payload portion comprising a payload of data stored in the buffer memory circuit, and
the next-entry pointer comprising an identifier for a next buffer memory circuit in a corresponding sequence of buffer memory circuits,
the first sequence is allocated for a first virtual channel circuit comprising a first start pointer identifying the entry identifier for an initial buffer memory circuit of the first sequence,
the second sequence is allocated for a second virtual channel circuit comprising a second start pointer identifying the entry identifier for an initial buffer memory circuit of the second sequence,
updating the next-entry pointer of a buffer memory circuit of the first sequence, to reprogram the first virtual channel circuit, based on determining a fault within the first sequence,
a length of the first sequence of buffer memory circuits is defined by the second start pointer for the second virtual channel circuit, and
a final buffer memory circuit of the first sequence of buffer memory circuits precedes the initial buffer memory circuit of the second sequence of buffer memory circuits.

17. The buffer memory pool circuitry of claim 16, further comprising a processor circuitry configured to:
identify a reprogram request to change an aspect of the first virtual channel circuit and the first sequence of buffer memory circuits,
determine an update pointer value to the first start pointer for the second virtual channel circuit and an update ID value to the next-entry pointer for a terminal buffer memory circuit of the first sequence of buffer memory circuits based on the identified reprogram request;
update the second start pointer for the second virtual channel circuit based on the update pointer value;
update the next-entry pointer for the terminal buffer memory circuit of the first sequence of buffer memory circuits of the first virtual channel circuit based on the update ID value; and
monitor usage of the first virtual channel circuit to determine a subsequent reprogramming of the first virtual channel circuit.

18. The buffer memory pool circuitry of claim 17, wherein the processor circuitry is further configured to update the next-entry pointer for the initial buffer memory circuit of the second sequence of buffer memory circuits for the second virtual channel circuit based on the update of the second start pointer for the second virtual channel circuit.

19. The buffer memory pool circuitry of claim 17, wherein the second start pointer for the second virtual channel circuit corresponds to the entry identifier of the initial buffer memory circuit of the second sequence of buffer memory circuits for the second virtual channel circuit that is subsequent to the first sequence of buffer memory circuits for the first virtual channel circuit.

20. The buffer memory pool circuitry of claim 17, wherein the corresponding sequence of buffer memory circuits for each of the first virtual channel circuit and the second virtual channel circuit is implemented as a first-in-first-out (FIFO) buffer.

* * * * *